US005923756A

United States Patent [19]

Shambroom

[11] Patent Number: 5,923,756
[45] Date of Patent: Jul. 13, 1999

[54] METHOD FOR PROVIDING SECURE REMOTE COMMAND EXECUTION OVER AN INSECURE COMPUTER NETWORK

[75] Inventor: W. David Shambroom, Arlington, Mass.

[73] Assignee: GTE Laboratories Incorporated, Waltham, Mass.

[21] Appl. No.: 08/799,402

[22] Filed: Feb. 12, 1997

[51] Int. Cl.[6] ............................................. H04L 9/00
[52] U.S. Cl. ................................... 380/21; 380/25
[58] Field of Search ............................ 380/21, 25, 23; 340/825.34; 705/44

[56] References Cited

U.S. PATENT DOCUMENTS

| | | | |
|---|---|---|---|
| 5,313,521 | 5/1994 | Torii et al. | 380/25 |
| 5,349,643 | 9/1994 | Cox et al. | 380/25 |
| 5,416,842 | 5/1995 | Aziz | 380/25 |
| 5,511,122 | 4/1996 | Atkinson | 380/25 |
| 5,590,199 | 12/1996 | Krajewski, Jr. et al. | 380/25 |
| 5,604,803 | 2/1997 | Aziz | 380/25 |
| 5,764,687 | 6/1998 | Kells et al. | 380/23 |
| 5,768,504 | 6/1998 | Kells et al. | 380/25 |

OTHER PUBLICATIONS

MIT, Kerberos V5 Installation Guide (Release beta 7), Sep. 11, 1996.

MIT, Kerberos V5 System Administrator's Guide (Release beta 7), Sep. 10, 1996.

MIT, Kerberos V5 UNIX User's Guide (Release beta 7), Sep. 10, 1996.

MIT, Kerberos V5 Application Programming Library, Sep. 10, 1996.

MIT, Kerberos V5 Data Encryption Standard Library draft, p. 1.

MIT, Kerberos V5 Implementer's Guide, Sep. 10, 1996.

Jaspan, Barry, Kerberos Administration System KADM5 API Functional Specifications, Sep. 10, 1996.

Jaspan, Barry, KADM5 Library and Server Implementation Design, Sep. 10, 1996.

Freier, Alan O., et al., The SSL Protocol, Version 3.0, Mar. 4, 1996.

Kohl, J. and Neuman, C., The Kerberos Network Authentication Service (V5), Sep. 1993.

Schneier, Bruce, Applied Cryptography, 2nd ed. (1996), pp. 566–572.

Steiner, Jennifer G., et al., "Kerberos: An Authentication Service for Open Network Systems," Mar. 30, 1988.

Kohl, John T., et al., "The Evolution of the Kerberos Authentication Service," Spring 1991 EurOpen Conference, Tromso, Norway.

Gradient Technologies, Inc., Web Integration Strategies: Believe It Or Not–Gradient Technologies' WebCrusader, Apr. 1996, pp. 1–12.

Gradient Technologies, Inc., Developing Secure Web–based Java Applications, The Integration of Web Crusader and Net Dynamics, May 1997, pp. 1–16.

(List continued on next page.)

Primary Examiner—Salvatore Cangialosi
Attorney, Agent, or Firm—Leonard Charles Suchyta; Floyd E. Anderson

[57] ABSTRACT

A method and apparatus is disclosed for enhancing the security of a message sent through a network server from a client computer to a destination server. A secure connection for receiving and transmitting data is established between the client computer and the network server. Using client-identifying information and a secure authentication protocol, the network server may then obtain client-authentication information from a validation center. The client-authentication information is transmitted to the client and erased from the network server. The network server then receives the client-authenticating information back from the client with an accompanying message for the destination server. The network server may use the client-authenticating information to obtain permission data from the validation center for use in accessing the destination server.

27 Claims, 11 Drawing Sheets

OTHER PUBLICATIONS

Gradient Technologies, Inc., Encryption Security In the Enterprise, Public Key/Secret Key, Jan. 1997, pp. 1–20.

InformationWeek, Spinning A Secure Web, Aug. 12, 1996 (4 pages).

Gradient Technologies, Inc., NetCrusader Product Data Sheet, NetCrusader's Distributed Services Product Line, Mar. 1997 (4 pages).

Gradient Technologies, Inc., NetCrusader Product Family Overview, Mar. 1997 (4 pages).

Gradient Technologies, Inc., NetCrusader Product Data Sheet, NetCrusader Commander, Mar. 1997 (4 pages).

Gradient Technologies, Inc., WebCrusader Product Data Sheet, WebCrusader Product Line, Mar. 1997 (4 pages).

Gradient Technologies, Inc., Web–based Applications Make the Grade at Penn State University, 1996 (2 pages).

Kamens, Jonathan I., KADM5 Admin API Unit Test Description, Sep. 10, 1996.

Kamens, Jonathan I., Open V*Secure Admin Database API Unit Test Description*, Sep. 10, 1996.

MIT, Kerberos V5 Installation Guide (Release 1.0) Dec. 18, 1996.

MIT, Kerberos V5 System Administrator's Guide (Release 1.0), Nov. 27, 1996.

MIT, Kerberos V5 UNIX User's Guide (Release 1.0), Dec. 18, 1996.

MIT, Upgrading to Kerberos V5 from Kerberos V4 (Release 1.0), Dec. 18, 1996.

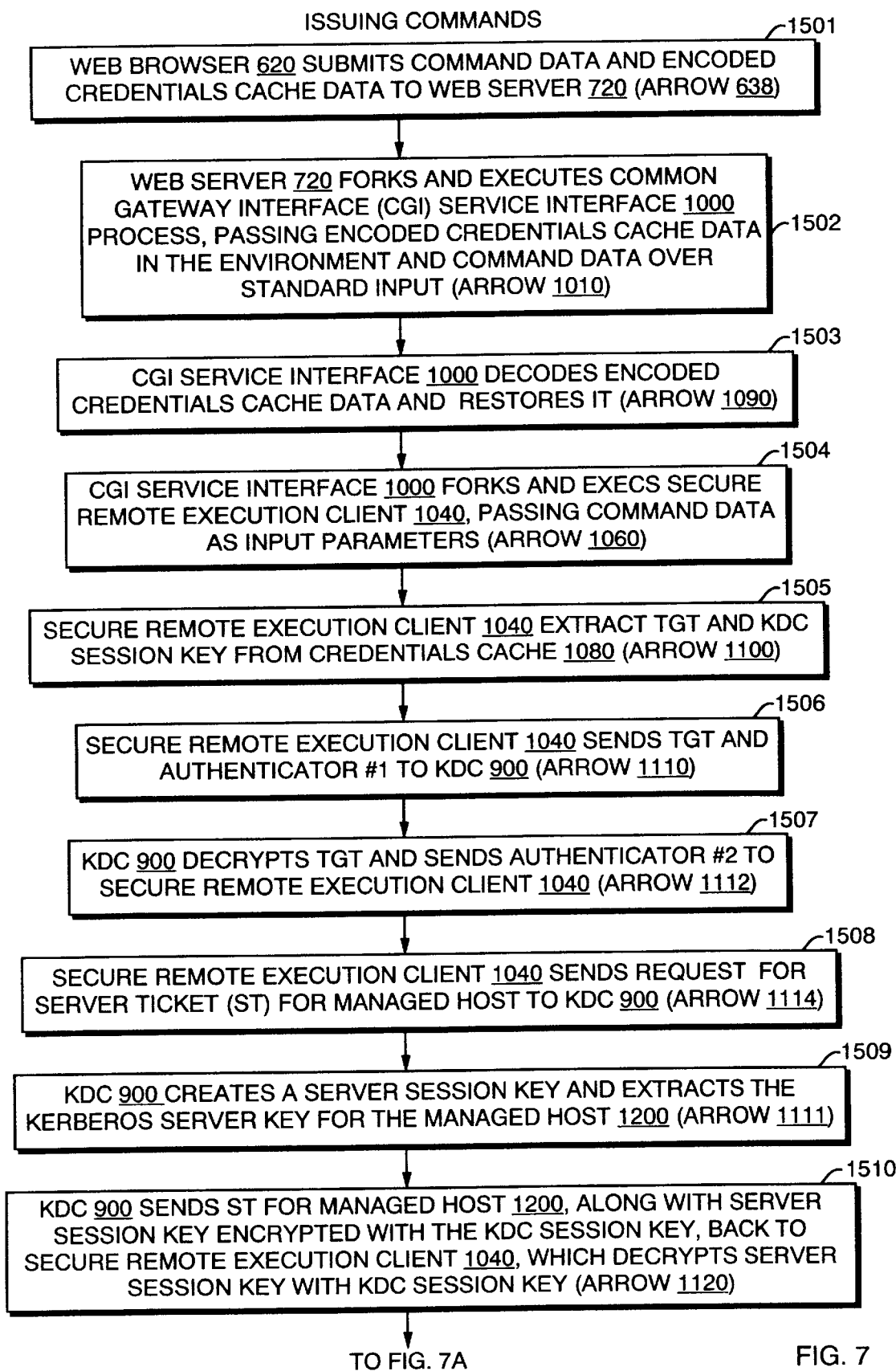

METHOD FOR PROVIDING SECURE REMOTE COMMAND EXECUTION OVER AN INSECURE COMPUTER NETWORK

BACKGROUND OF THE INVENTION

The present invention relates to improving the security of data transmission between computers using an insecure network, particularly to methods and systems for improving the integrity and security of messages transmitted from a client to a network server and then to a destination server or from the destination server to a network server and then to the client as part of a distributed computer system.

A distributed computer system contains multiple distinct computers, which are interconnected. One simple example of a general-purpose distributed system is a networked system containing several workstations and servers interconnected through a network. Networks are popular because they allow organizations to share information and resources. Furthermore, in a networked system, if one computer breaks, or "crashes," the others may continue to operate.

The type, cost and reliability of the manner of interconnection can be important considerations in networked systems. Large networks over relatively short distances typically use local area networks (LAN) such as an Ethernet or a Token Ring, which permit communications between a number of different computers on one or more wires. The use of modems allows computer networks to be created over a larger area, because the connections can be made over data links such as telephone lines. Wide area networks (WAN) typically use a combination of fiber optic and copper wire telephone lines as well as microwave links and satellites to connect several smaller LANs. Networks of networks are often referred to as internetworks.

Computer networks, particularly internetworks, can be vulnerable to security breaches. The degree of security of each component in the network differs, in part because each entity may be protected by varying layers of physical and operational security. Furthermore, each component or network in an internetwork may be owned or controlled by different organizations whose security practices differ widely. The interconnections between the computers may be similarly insecure. Since some part of the network may use physically insecure links, such as telephone lines or microwave links, hackers and interlopers may eavesdrop or intercept communications over the telephone line and modify them according to their wishes or copy them for later use. Interlopers who copy login and/or command information have the potential to use that information to gain access to other computers on the network.

Network security is typically based on three general concepts. For every request to do an operation, such as execute a diagnostic routine or perform a remote login, the network 1) authenticates the request; 2) controls access via access control criteria; and, 3) audits every request to detect unauthorized uses.

Authentication is the process of determining that an authorized user initiated the request and that the request was not modified improperly by an interloper on the way to the destination. One common example of authentication is the use of a password at time of login. Upon receiving a username and password from the user, a host computer compares the password to a list of authorized usernames in an access control file, and if the password matches the password associated with that username, the host computer allows access. In the situation just described, however, it is assumed that the user and host are communicating over a secure connection; otherwise, interlopers could intercept the communications from the user to the host and steal the username and password information. The interloper could then illegally access the host at a later time by using the stolen username and password information.

In a networked system comprising multiple interconnected computers, a first computer may request service from a second or destination server through an intermediate server. This first computer is typically called a client. In order to receive service from a destination server, the client must begin by authenticating itself to the destination server. However, because the client may be communicating to the destination server over an insecure line, the client cannot simply send a password in the clear. Instead, the client and the destination server may engage in a multiple query and response exchange, constituting an authentication process, which will convince the destination server that the requesting client is an authorized user.

The prior art includes examples of encryption-based authentication processes that can be used to so authenticate a client to such a server. Such authentication processes can be based either on public-key or secret-key encryption systems. In a typical secret-key authentication scheme, each authorized party possesses a secret key, which is known only by the party and is registered with a trusted third party, or authentication server. The authentication server maintains a list of registered users and secret keys and, therefore, must be physically secure. By contrast, in a public-key authentication system, each user has a public key and a private key. The public key is posted; the private key is known only to the user. Authentication using a public-key authentication system is attractive because it does not require a secure authentication server.

One example of a secret-key based network authentication system is the trusted third-party authentication service called Kerberos. Network services and clients requiring authentication register with Kerberos and receive a secret key, where said key (or a pass phrase from which it can be derived) is known only to the user and a Kerberos host server. Kerberos also generates temporary session keys, which can be used to encrypt messages between two registered Kerberos principals (users or hosts). A typical Kerberos software package is Kerberos Version 5 from Project Athena at the Massachusetts Institute of Technology (MIT). The Kerberos authentication scheme also is discussed in J. Kohl and C. Neuman, The Network Authentication Service (V5), Request for Comments: 1510 (September 1993). Kerberos and other trusted third-party private authentication schemes can allow for speedier, secure access between two principals.

Other prior art systems have been developed to address network security issues. For example, two authentication protocols, Secure Sockets Layer (SSL) and Secure Hyper Text Transfer Protocol (S-HTTP), have been designed specifically to protect the information being transmitted across the Internet by using encryption. Both the client and the destination server must support SSL. SSL is application independent and operates at the Transport layer, meaning that it operates with application protocols such as HTTP, ftp, telnet, gopher, Network News Transport Protocol (NNTP), and Simple Mail Transport Protocol (SMTP). SSL supports several cryptographic algorithms to handle the authentication and encryption routines between the client and the server.

S-HTTP is a secure extension of HTTP, a communications protocol of the World Wide Web. S-HTTP is a publicly available protocol developed by Enterprise Integration Technologies. Unlike SSL, S-HTTP is more closely related to the HTTP protocol. Also, while SSL typically encrypts the communications link between a client and a server, S-HTTP can encrypt each message individually. In a client/server transaction under S-HTTP, the client does not need to possess a public key. Secure transactions may take place at any time, because the sender of an S-HTTP message sends its cryptographic preferences along with the message.

A current trend in distributed system development is the concept of managed hosts. In a managed host system, a client will access a network server and, via the network server, request access to a second server, which may be referred to as the remote host, or the managed host. In larger networks, the network server may be acting as a gateway and proxy for a large number of clients to access a large number of destination servers. In order for the transaction from a client to a destination server to be secure, both the transactions between the client and the network server and the transactions between the network server and the destination server should be secured by a network authentication process.

In a certificate-based authentication scheme, all entities that wish to communicate with one another must register with a third party called a certificate authority. The certificate authority verifies the identity of the registering party and issues certificates which the parties can then use to authenticate themselves to other registered parties. There are many certificate authorities offering suitable certificates of authentication including, for example, IBM's World Registry and Sun Microsystem's SunCA.

There are a number of problems associated with simply using one type of authentication process to secure the transactions between the client and network server and those between the network server and the destination server. Use of this system, for example, would require that the network server, all clients and all destination servers possess a certificate ultimately traceable to the same top-level certification authority. Furthermore, each individual user of a client system must be issued a client certificate. If the client certificates were stored on the individual workstations, the client would be restricted to using only particular workstations. If the client certificates were stored on a portable media, such as diskettes, they would be subject to loss or theft, decreasing the security of the overall network system. Moreover, client workstations may be any one of a number of different hardware devices, such as PCs or Macintosh, running a variety of different operating systems, such as UNIX or DOS, and there is no single medium supported by all the varieties of clients. In summary, use of a certificate authentication scheme between the client and the network server would be administratively difficult to support.

If Kerberos authentication for all transactions is used, each client workstation is required to possess the software necessary to communicate with the key distribution center. This approach encounters problems including that of providing many different versions of the software to support the many varieties of clients.

If one authentication scheme is used to secure transactions between the client and the network server, while another authentication scheme is used to secure transactions between the network server and the destination server, then in transactions between the client and the destination server, the network server must act as a proxy for the client, and it may sometimes be undesirable to require the network server to perform client authentication. Since, by using two different authentication schemes, the client would not be authenticating itself to the destination server directly, the network server needs to act as if it has the identity and memory of the client server. In server-to-server transactions, the user typically has logged on to the network server using a shell program. The shell program creates records on the network server that maintain a record of the user's identity and use (i.e. time and date). As long as the user is logged on, the shell logon program exists. In contrast, in a client-to-managed host transaction, the shell logon program is active on the client computer, but not on the server. The network server, instead, is interfacing with a key distribution center, or authentication server, on behalf of the client. To do this, a network server configured as a World Wide Web server creates and executes transient processes (such as when an HTTP Common Gateway Interface (CGI) request is executed) to query the key distribution center. These temporary processes must assume in some sense the identity of the user for the length of the transaction. Once their function is complete, however, these transient processes terminate and disappear, resulting in the loss of any identity or session state data they may have acquired.

When a network server does not maintain any information on a client once it has finished processing a request by the client, the server is described as stateless. A stateless file server avoids retaining client information by deriving information about files and positions within files from the request itself. A stateful server (e.g., one that stores file information in volatile memory) loses the information when the server crashes. In addition, if the client fails, the server may be unaware that the client is no longer using the space allocated to retain information needed for the transactions and may be unable to reclaim the space. In contrast, following the crash of a client or server, the stateless server need only respond to the last fully self-contained request from the client to continue the operation. In a UNIX operating environment, the UNIX processes (e.g. daemons) are sometimes stateful. Individual transient processes, however, are not persistent and, therefore, cannot maintain state information internally.

There is a need, therefore, for a method of and system for increasing security of transactions involving multiple networked computers, and for increasing security of transactions involving a client that sends commands to a managed host via an intermediate server through a insecure connection such as the Internet.

There is also a need for a method of and system for increasing security of transactions involving a client, a network server, and a managed host, where the client is not restricted to one of a limited subset of devices or operating systems because of interoperability or administration concerns.

Moreover, a need exists for a method of and system for increasing security of transactions involving a client, a network server, and a managed host, where the increased security is attained by using an SSL protocol for communications between the client and the network server, a Kerberos authentication system is used to authenticate the identity of the client to the managed host and the managed host to the client, and the client communicates with the managed host through an insecure network connection such as the Internet.

Needs also exist to allow many varieties of clients to communicate with a destination server via a network server over an insecure network connection using authentication protocols and to allow transmission of data or commands over an insecure computer network from a client to a destination server via a network server.

Another desire is for a system and method to allow necessary client information to pass to the network server with each transaction so that the network server may access the destination server on behalf of the client.

Further objects of the present invention will become apparent from the following drawings and detailed description of the preferred embodiments.

SUMMARY OF THE INVENTION

Systems and methods consistent in this invention increase security of data transmissions between a client, a network server and a managed host using an insecure network, such as the Internet. After establishing a secure network connection between a client and a network server, a secure authentication protocol is used to obtain at the network server client-authenticating information from a key distribution center. The client-authenticating information is transmitted from the network server to the client and erased from the network server. The client-identifying information is transmitted back to the network server from the client along with a message for the destination server. Permission is obtained to access the destination server from the key distribution center over the insecure network using the secure authentication protocol. At the destination server, the authority of said client to access said destination server is validated using the message. The destination server is accessed with the message if the client's authority is properly validated.

Establishing the secure network connection between the client and the network server can use the Secure Sockets Layer (SSL) protocol. Obtaining client-authenticating information and securing the network connection between the network server and the destination server can use the Kerberos authentication protocol. Access to the destination server by authenticated users can be controlled by access control lists on the destination server.

A computer system consistent with the present invention, comprises a first computer server, such as a client, that issues commands over a network connection, and a second computer server, such as a network server, responsive to the first server and for accessing a fourth server on behalf of the client. The first and second servers can communicate via the same network operable connection therebetween. The second server also has an authentication device capable of generating an authentication request on behalf of the first server. A third computer server, such as a key distribution computer, receives the authentication request, responds to the request to authenticate the identity of the first server, and sends authentication indicator information regarding the first server back to said second server via the network. A fourth computer server, such as a managed host, is also interconnected to the network for receiving and executing the command from the first server if the network server transmits the authentication indicator information to the managed host and if the first server is authorized to access the fourth server.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE INVENTION

A. First Embodiment

The method and apparatus useful to implement the present invention will first be discussed in general with reference to FIGS. 1, 2, and 3.

Figure 1:
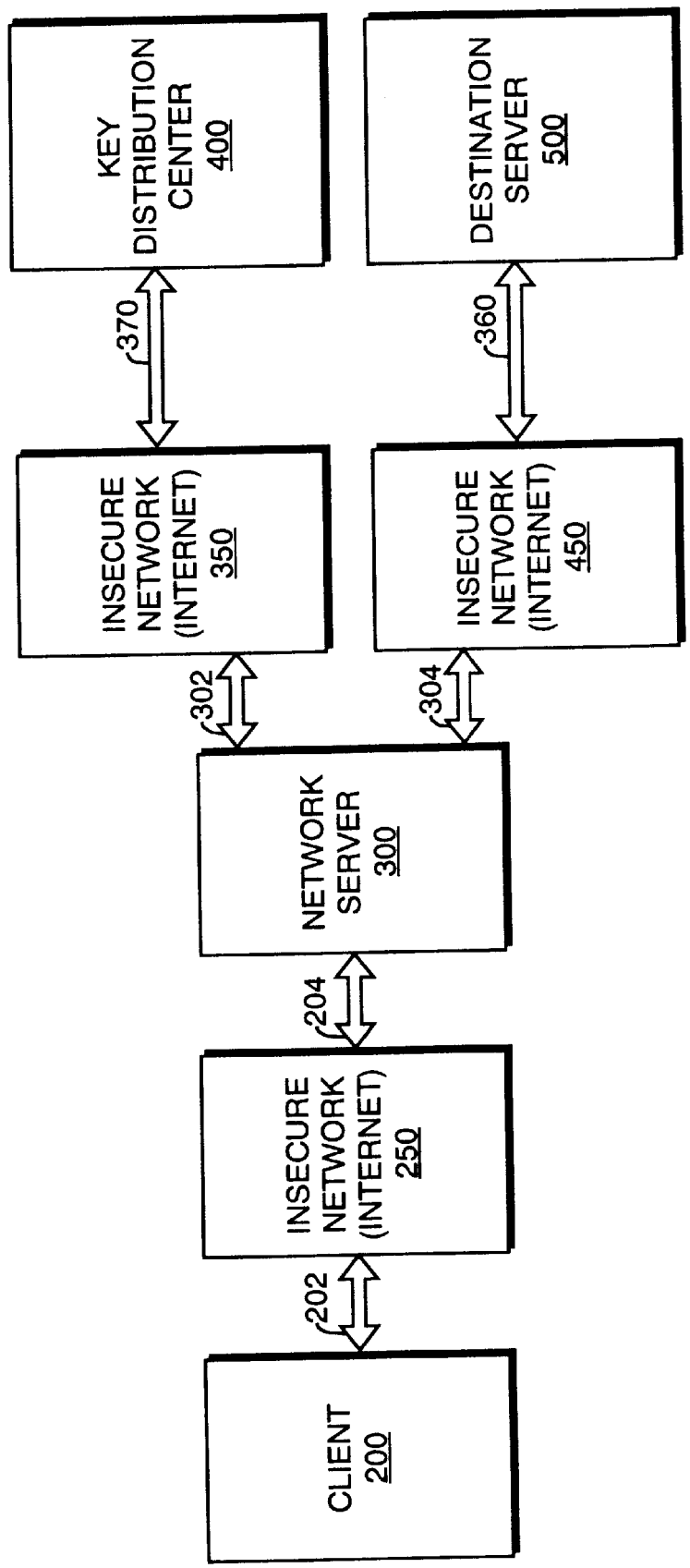
FIG. 1 is a block diagram of one system that may be used to implement the present invention.

As shown in FIG. 1, the present invention uses a client workstation (indicated generally as client 200), which can be, by way of example only, a personal computer (PC) running Microsoft Windows, Windows95, or WindowsNT, a MacIntosh or a UNIX workstation. Client 200 is connected to an insecure network 250 (such as the Internet) via data link 202. A network server 300, which communicates with client 200 along insecure network connection 250, can, by way of example only, be a UNIX server. Network server 300 is connected to insecure network connection 250 via data link 204 as well as a second insecure network connection 350 via suitable data link 302 and a third insecure network connection 450 via suitable data link 304. Destination server 500 communicates with network server 300, also through the insecure network connection 450, via data link 360. Destination server 500 can be, by way of example only, a UNIX server. A key distribution center (KDC) 400, which validates requests to establish proper identity, is likewise in communication with network server 300 through data link 370 and insecure network connection 350.

It is understood that FIG. 1 describes an exemplary network where each of the hardware components may be implemented by conventional, commercially available computer systems. Data links 202, 204, 302, 360, and 370 can be any suitable communications medium, such as, for example, data links using modems. Also, by way of example only, each computer or server can operate using an operating system such as UNIX.

Additionally, network server 300 and KDC 400 may contain information that can be used to compromise the security of the system, therefore, physical access to network server 300 and KDC 400 should be adequately controlled.

1. Establishing a Secure Network Connection Between a Client and a Network Server In the embodiment of FIG. 1, client 200 and network server 300 communicate via insecure network 250. Client 200 is connected to insecure network 250 via data link 202 which, by way of example only, may be a TCP/IP network connection. Network server 300 is connected to insecure network 250 via data link 204 which also may be a TCP/IP network connection. To enhance message privacy and integrity, client 200 and network server 300 preferably communicate using a secure authentication and/or encryption protocol to establish a secure network connection between client 200 and network server 300. Any suitably reliable publicly available authentication protocol may be used, provided that such protocol is capable of successfully proving the identity of network server 300 to client 200 to thereby result in confidence on the part of client 200 that future communications are with network server 300 and not some impersonating entity. The authentication protocol preferably also produces a session key that is known only to client 200 and network server 300 and which can be used to encrypt subsequent transactions between client 200 and network server 300. One example of such an authentication protocol that has been developed specifically for use with TCP/IP Internet connections is the publicly available Secure Sockets Layer (SSL) protocol, Version 3.0, developed by Netscape Communications Corporation.

Figure 2:
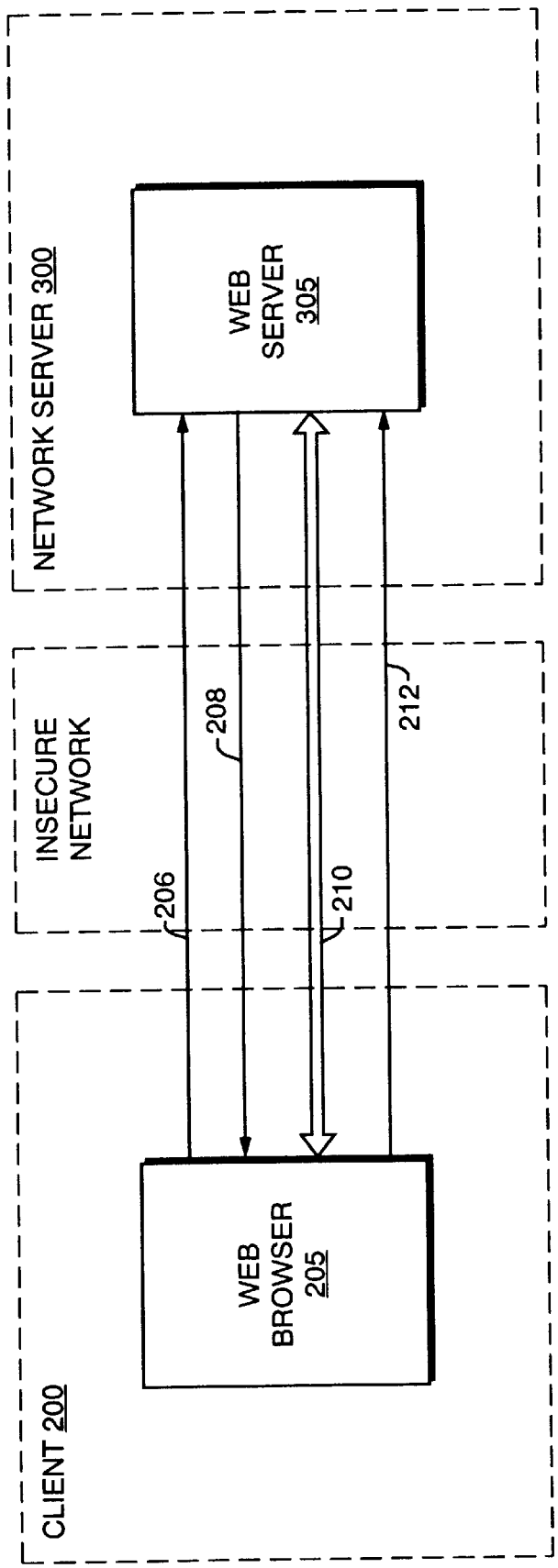
FIG. 2 is a more detailed block diagram of the client and network server of FIG. 1.
Figure 3:
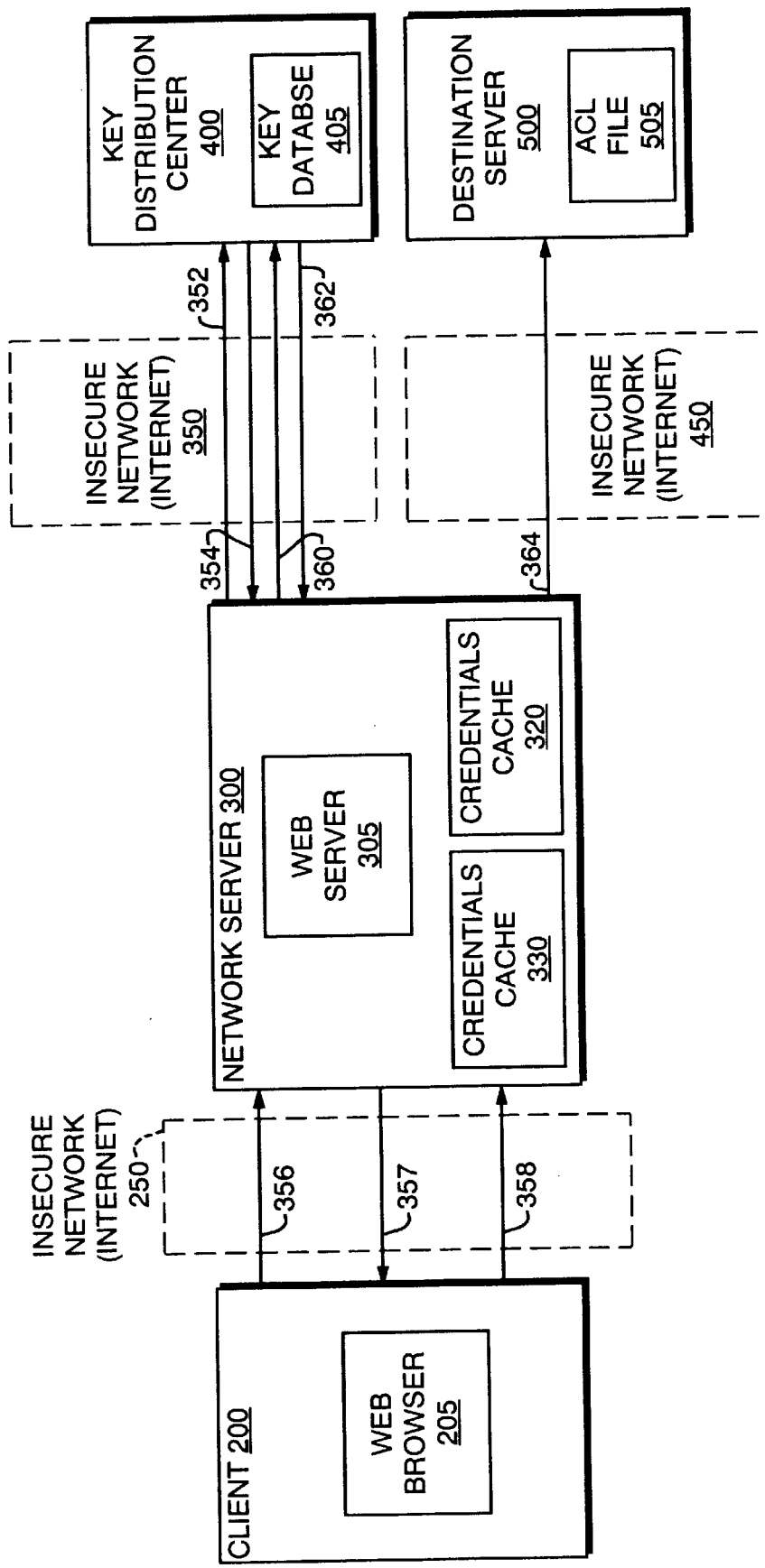
FIG. 3 is a more detailed block diagram of the client, network server, key distribution center, and destination server of FIG. 1.

FIG. 2 shows in more detail one embodiment of the manner in which communications can be carried out between client 200 and network server 300. As shown in FIG. 2, client 200, which can include a web browser 205, initiates a request for authenticated secure access to the web server 305 of network server 300 as indicated by arrow 206. Client 200 may be operating any publicly available web browser software package such as, for example, Netscape Navigator. Because the request may be transmitted in the clear across an insecure communications link, the request at 206 should not contain login or password information.

Web server 305 of network server 300 responds to the request at 206 by transmitting information back to web browser 205 that will be used to authenticate the identity of network server 300 to client 200 and support generation of additional information which will be used to encrypt future transmissions between client 200 and network server 300. If, for example, an SSL transaction is employed in the system of FIG. 2, web server 305 sends web browser 205, as indicated by arrow 208, a certificate that includes network server 300's public key and an identifier indicating a cryptographic algorithm supported by network server 300. To properly establish the connection, network server 300 and client 200 perform a handshake process indicated at arrow 210 which, if successfully completed, provides both client 200 and network server 300 with a session key known only to network server 300 and client 200. This session key can be used to encrypt future transactions between network server 300 and client 200. In the handshake process of SSL, for example, client 200 creates a session key, encrypts the session key using one of the cryptographic algorithms indicated by network server 300 in the certificate and the public key sent by network server 300, and sends the encrypted session key to network server 300. After receiving the encrypted session key, network server 300 authenticates itself to client 200 by decrypting this session key and returning to client 200 a message encrypted with the underlying session key.

When the handshake indicated at arrow 210 is successfully completed, client 200 and server 300 continue to use the session key to encrypt future transactions. As depicted generally in FIG. 1, the connection 202 and 204 between client 200 and server 300 are therefore protected to the degree of security achieved by the encryption algorithm.

Once an appropriately secure network connection is established between client 200 and network server 300, server 305 now sends a login form to client 200, and as indicated at 212, client 200, returns login data consisting of the name and password of a Kerberos principal to web server 305.

2. Authenticating a Client to a Key Distribution Center and Obtaining Client-authenticating Information from the Key Distribution Center FIG. 3 depicts, by way of example only, the process of obtaining client-authenticating information from KDC 400 over an insecure TCP/IP network 350, such as the Internet, that will later be used to establish that network server 300 is acting on behalf of the Kerberos user principal. Other publicly available secure authentication protocols may be used. The security of the system, however, may be enhanced further by implementing an authentication protocol that incorporates the use of timestamps. Timestamps can be used to restrict replay attacks, or the recording of some portion of an authentication protocol sequence and use of old messages at a later date to compromise the authentication protocol.

One example of a publicly available authentication protocol using timestamps is Kerberos Version 5 developed by Project Athena at MIT. The preferred embodiment as described below assumes the use of Kerberos Version 5. The details of this authentication procedure follow.

Once web server 305 receives encrypted login information from web browser 205 as indicated by arrow 356, network server 300 passes the Kerberos user principal name of client 200 and a request for a permission indicator to KDC 400 over insecure network 350 as indicated by arrow 352. Upon receiving the request for a permission indicator at 352, the KDC 400 generates a KDC session key for protecting transactions between network server 300 and KDC 400.

Using client 200's Kerberos user principal name received at 352, the KDC 400 extracts client 200's secret key from key database 405, which stores secret keys used by KDC 400 and other properly registered clients. Using client 200's secret key, the KDC 400 then encrypts one copy of the KDC session key and creates a permission indicator, which would typically include by way of example only, a timestamp, client 200's user name and network address, and another copy of the KDC session key. This permission indicator will be used later by client 200 to authenticate itself to KDC 400. The permission indicator is encrypted with KDC 400's private key, which is known only to KDC 400; KDC 400, therefore, can later decrypt the permission indicator to verify its authenticity.

KDC 400 then sends both the encrypted session key and the permission indicator back to the network server 300 as indicated at arrow 354. Network server 300 receives the encrypted information from KDC 400, and decrypts the KDC session key using client 200's user key. In one embodiment, the client user key is a one-way hash of client 200's password and other information, so the network server is able to derive the user key by hashing client 200's password. Both the permission indicator and the KDC session key are stored in credentials cache 320. Web server 305 encodes the contents of the credentials cache 320 and, as indicated at arrow 357, sends the contents of the credentials cache 320 to web browser 205. The authenticating information that may have resided in the network server 300 is then erased or otherwise deleted. Thereafter, in order for client 200 to continue with the transaction, client 200 will have to refresh the memory of server 300. If a hacker or interloper managed to gain access to network server 300 while information was stored in credentials cache 320, only the permission indicator and session key could be obtained, because the Kerberos password is destroyed after being used. This information would be of limited value, however, because the permission indicator, in the preferred embodiment, would contain a date/time stamp and would become worthless after a specified period of time, usually relatively short, has elapsed.

3. Sending a Command to a Destination Server

Now that it has the encoded credentials cache information from cache 320, client 200 can send this cache information along with a message, such as a command ultimately intended for destination server 500, to the network server 300 as indicated at arrow 358. Network server 300 decodes the encoded credentials cache information and stores the permission indicator and KDC session key in a credentials cache 330. Although this credentials cache 330 is not the same as credentials cache 320, which as described above, the data therein is the same. In actuality, the information could be stored in the same location on the same physical storage device, although as a practical matter this is highly unlikely.

As indicated at arrow 360, network server 300 now sends the permission indicator encrypted by the session key to KDC 400, along with an authenticator and a request to access destination server 500. This authenticator contains the Kerberos user principal name and a time stamp, encrypted using the KDC session key. KDC 400 decrypts the permission indicator using the KDC secret key to obtain the KDC session key and a validity period. If the KDC 400 decrypts successfully, the KDC is assured that the permission indicator is the same one that it issued earlier. The KDC 400 then uses the KDC session key to decrypt the authenticator to obtain the Kerberos user principal name and a time stamp. If the time stamp is within the validity period, the KDC 400 generates an access indicator. The access indicator typically would include the Kerberos user principal name, a validity period, and a server session key for use between network server 300 and destination server 500, all of which has been encrypted with the private key of the destination server 500. KDC 400 then sends to network server 300 the encrypted access indicator, and a copy of the server session key encrypted using the KDC session key, as indicated at arrow 362.

Thereafter, network server 300 decrypts the copy of the server session key that is encrypted using the KDC session key. Network server 300 then encrypts the message or command, using the server session key and, as indicated at arrow 364, sends the encrypted message along with the access indicator and a new authenticator to destination server 500 via insecure network 450. Destination server 500 uses its own private key to decrypt and obtain the server session key.

By using the server session key, known only to destination server 500 and the network server 300, the authenticity of the identity of client 200 can be validated at destination server 500. The destination server 500 can then trust the integrity of the message, such as a command, from client 200, thereby permitting access to server 500 if validation is correct. Destination server 500 can compare the identity of client 200 to a list of access control criteria (ACL) that can be stored in ACL file 505 in destination server 500.

B. Second Embodiment

Figure 4:
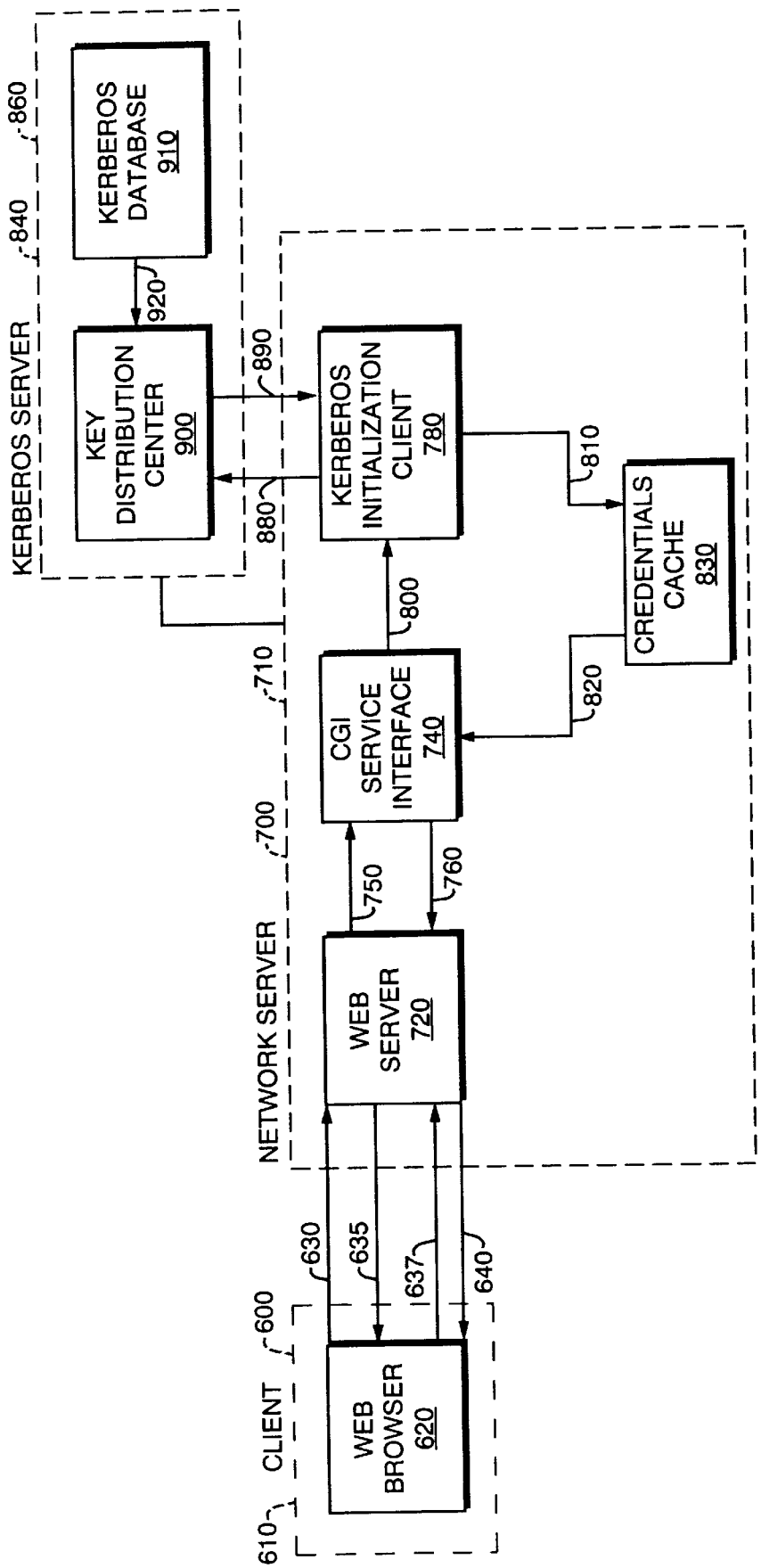
FIG. 4 is a block diagram of another system that may be used to implement the present invention.

A more detailed embodiment of the present invention, in particular an embodiment using a Kerberos authentication process, is depicted in FIGS. 4 through 7. FIG. 4, in conjunction with the flowchart of FIGS. 5–5a, describes the details of a login process. Once login has been properly achieved, FIG. 6, in conjunction with FIGS. 7–7b, describes the details of how a command is issued from a client to a destination server such as a managed host.

1. The Login Procedure

With reference now to FIG. 4, client 600, indicated generally by dotted lines 610, includes web browser 620. Web browser 620 communicates with network server 700, which is indicated generally by dotted lines 710. As will be further described below, arrows 630, 635, 637, and 640 indicate the exchange of information between web browser 620 and web server 720 of network server 700. Web server 720 exchanges information with a first CGI Service Interface 740, as indicated by arrows 750 and 760. CGI Service Interface 740 can be a process forked by web server 720. As indicated by arrows 800, 810, and 820, CGI Service Interface 740 in turn exchanges information with Kerberos Initialization Client 780, which can be a process forked by CGI Service Interface 740. Network Server 700 further includes credentials cache 830, which receives information from Kerberos Initialization Client 780 as indicated by arrow 810 and sends information to CGI Service Interface 740 as indicated by arrow 820.

As shown by arrows 880 and 890, network server 700, and in particular the Kerberos Initialization Client 780, communicates with a Kerberos server 840, indicated generally by dotted line 860. In this embodiment, Kerberos server 840 includes a Key Distribution Center (KDC) 900, which has access to Kerberos database 910 as indicated by arrow 920. Kerberos Server 840 can be a group of processes running on the same computer as the network server 700, or on a different computer.

Figure 5:
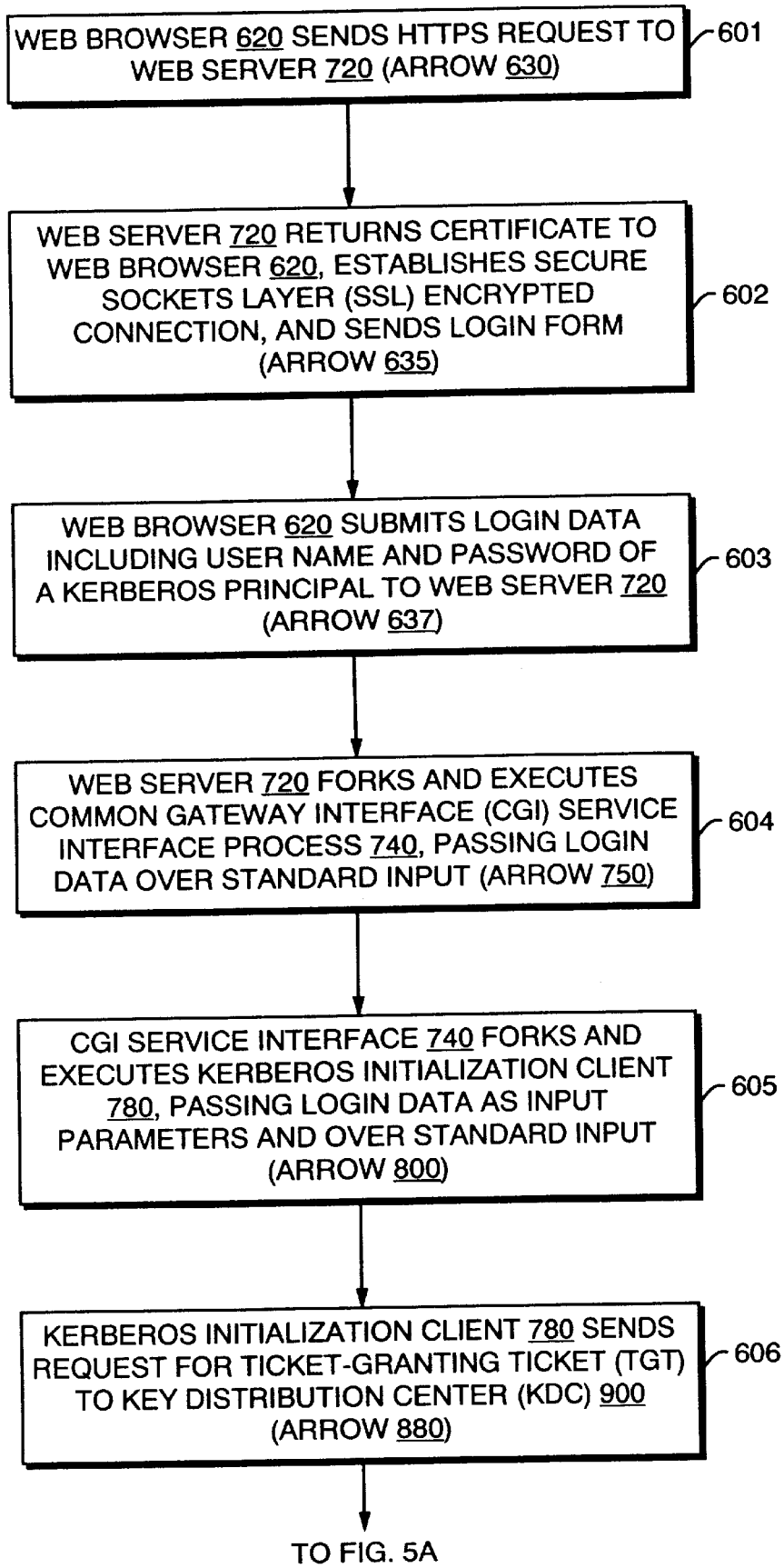
FIGS. 5–5a are flow charts showing the operation of the system of FIG. 4 in accordance with the present invention.
Figure 5A:
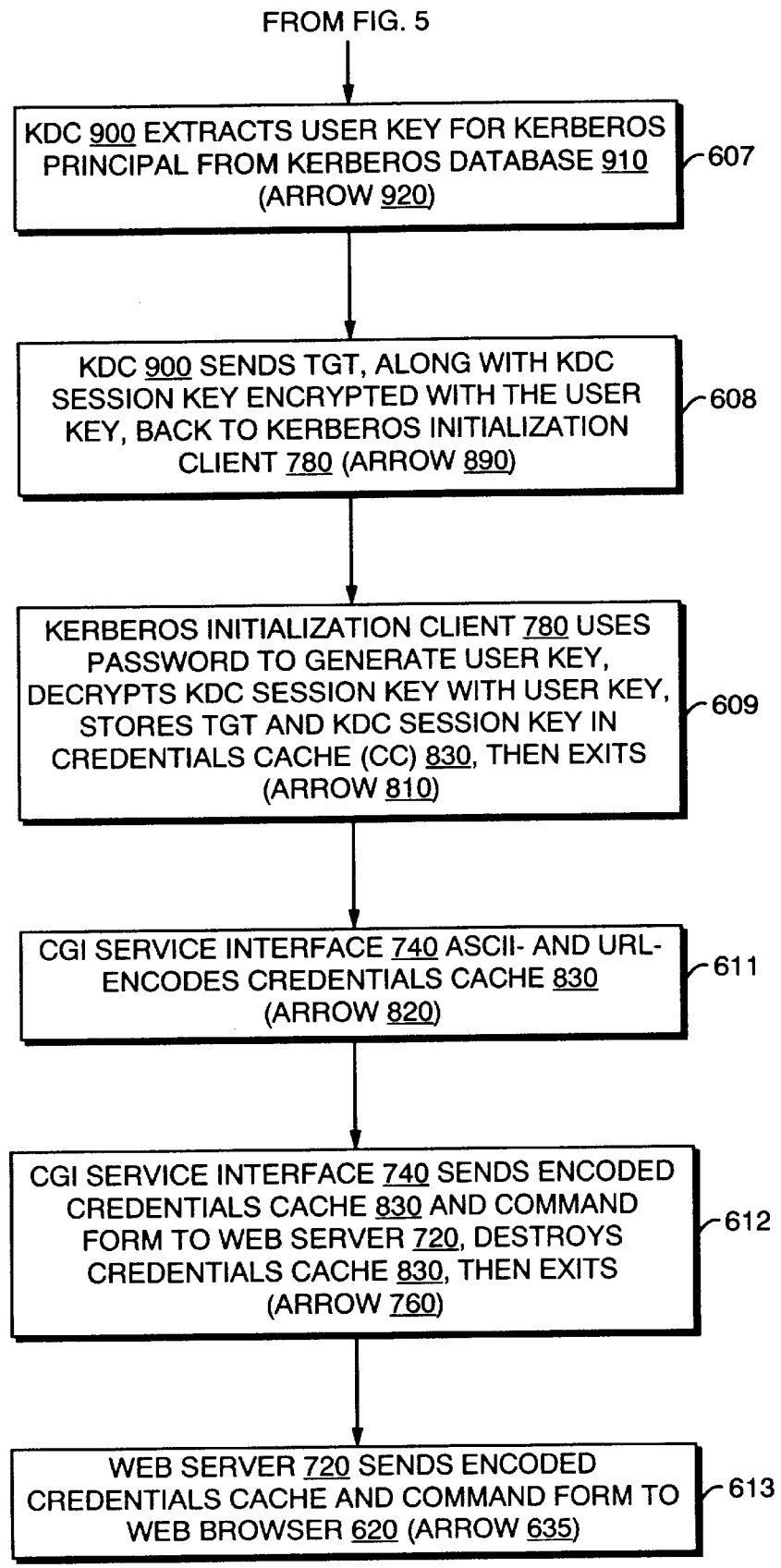

The flowchart of FIGS. 5–5a further describe how the system of FIG. 4 accomplishes the login procedure. The term "Arrow" used in the boxes of the flowchart refers back to the corresponding numbers in FIG. 4. Web browser 620 sends an HTTPS request to web server 720. [Box 601]. Web server 720 responds with a certificate to web browser 620. This certificate contains the network server's public key and a list of one or more cryptographic algorithms that the network server supports and, by way of example only, may resemble an ITU X.509 standard certificate. Web server 720 also establishes a Secure Sockets Layer (SSL) encrypted connection with Web browser 620, and sends a login form to browser 620. [Box 602].

In response, web browser 620 submits login data back to web server 720 that would include, in this example, the user name and password of a Kerberos principal. [Box 603].

Web server 720 executes Common Gateway Interface (CGI) Service Interface 740. The login data is passed from web server 720 to CGI Service Interface 740 over a standard input. [Box 604]. The CGI Service Interface 740 process is a transient process which passes login information to the Kerberos Initialization Client 780. More specifically, the CGI Service Interface 740 executes the Kerberos Initialization Client 780. Login data is passed as input parameters and over standard input to the Kerberos Initialization Client 780 from CGI Service Interface 740 via 800. [Box 605]. The Kerberos Initialization Client 780 sends a request for a ticket-granting ticket (TGT) to Key Distribution Center (KDC) 900 of Kerberos Server 840. [Box 606].

In other words, the Kerberos Initialization Client 780 initiates a request to the KDC 900 for a permission indicator, here, for example, the TGT. As already explained above, the permission indicator contains information that will be used during future transactions with KDC 900 for proper authentication.

KDC 900 extracts the user key for the Kerberos principal from Kerberos database 910. [Box 607]. In the Kerberos application, client 600's secret key is preferably a secure one-way hash of client 600's password. Then, the KDC 900 sends the TGT, along with a KDC session key encrypted with the user key, back to the Kerberos Initialization Client. [Box 608].

The Kerberos Initialization Client 780 uses client 600's password to generate the user key, decrypts the KDC session key with the user key, stores the TGT and KDC session key in credentials cache 830, and then exits. [Box 609]. Credentials cache 830 is a data storage device used in the processing of the transaction that makes this data available to the CGI Service Interface 740.

CGI Service Interface 740 ASCII- and URL- encodes the credentials cache. [Box 611]. The CGI Service Interface 740 then sends the encoded credentials cache and a command form to Web Server 720, destroys the credentials cache, then exits. [Box 612]. Web Server 720 sends the encoded credentials cache and the command form to Web Browser 620. [Box 613].

In other words, once the Initialization Client 780 stores the information in the credentials cache 830, the Initialization Client 780 exits. Because the Initialization Client 780 embodies a transient process, all data that is contained would normally be erased. A permission indicator and KDC session key, however, are temporarily stored in the credentials cache 830. The CGI Interface 740 extracts the contents of the credentials cache 830 and ASCII- and URL-encodes the contents. The CGI Interface 740 is also a transient process, and it is therefore necessary to extract and pass the information to web server 720 before exiting.

The web server 720 encrypts the encoded credentials cache and sends the data to the web browser 620, as well as a command form. Once the network server 700 sends the data to the client 600, all transient processes which handled the data exit and terminate and consequently, all authenticating information about client 600 is erased or removed. In order for client 600 to continue with the transaction, client 600 will have to refresh the memory of the server 720 and continue the second phase of the authentication process. Because there is no information relating to the transactions residing on the network server 700 during the time period in between transactions, if an unauthorized individual manages to improperly access the network server 700, as already explained above, any information obtained would be of limited value and the integrity of the system would be retained.

2. Issuing a Command

Figure 6A:
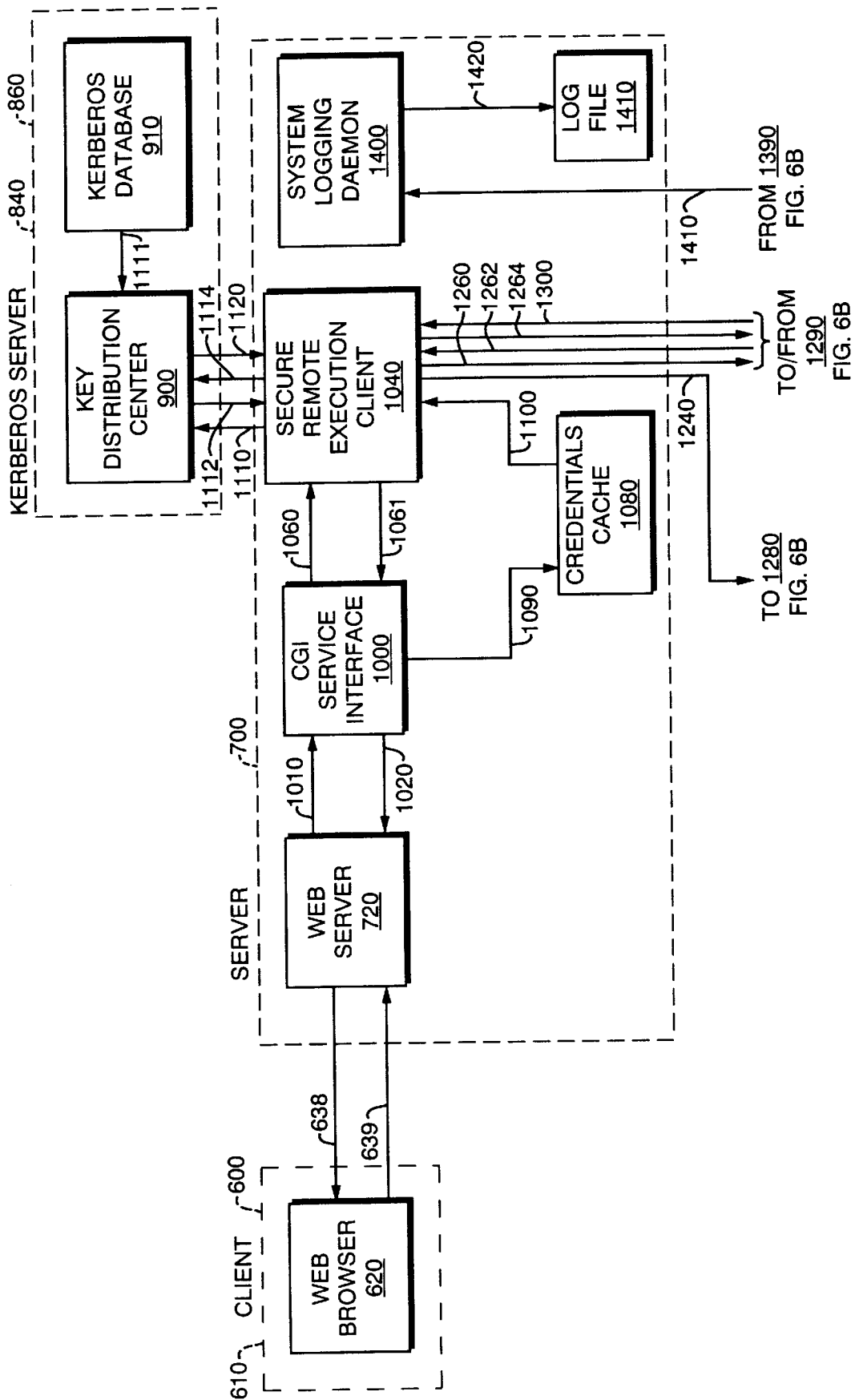
FIG. 6 is a block diagram showing additional aspects of the system of FIG. 4.
Figure 6B:
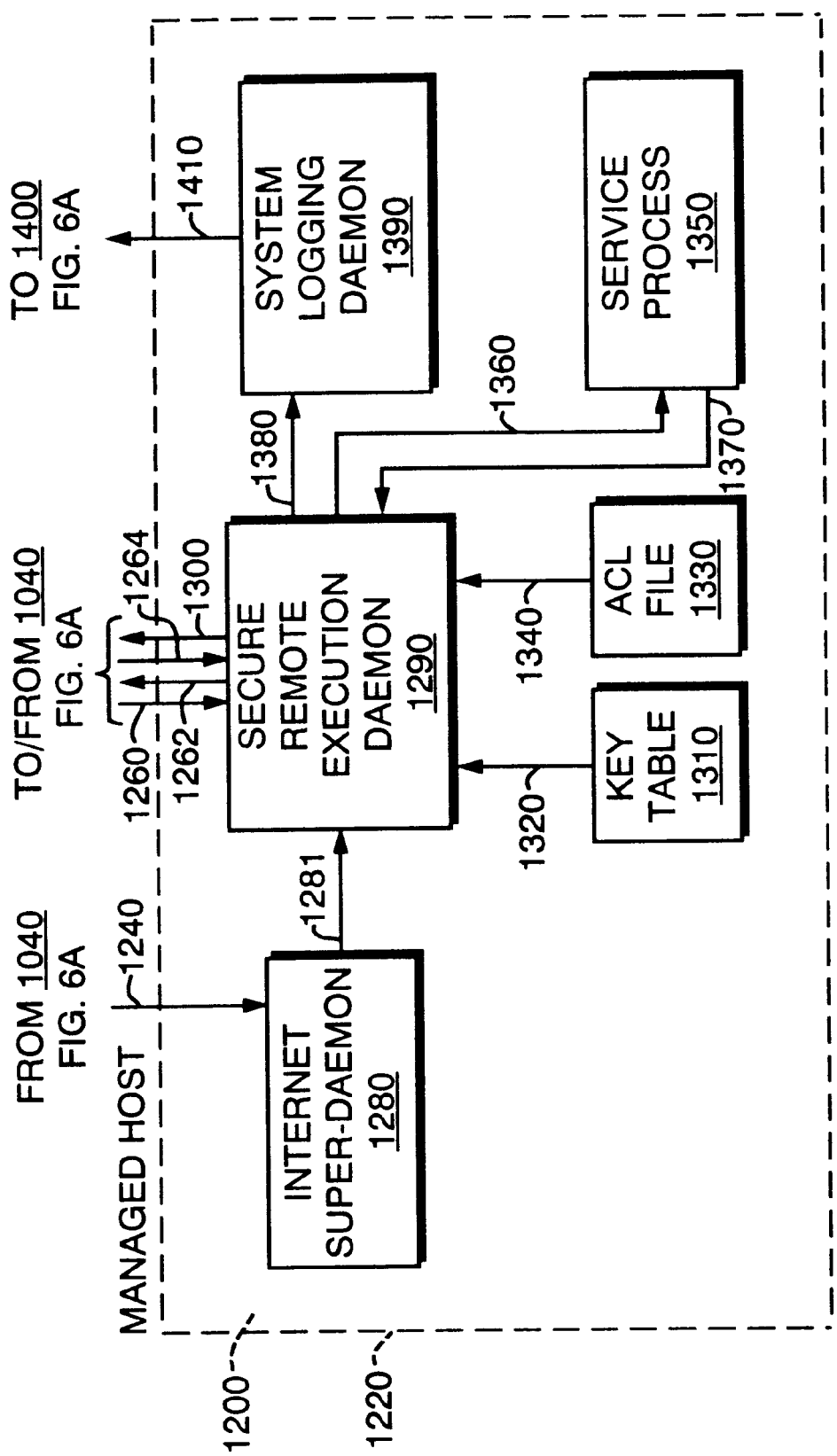
Figure 7A:
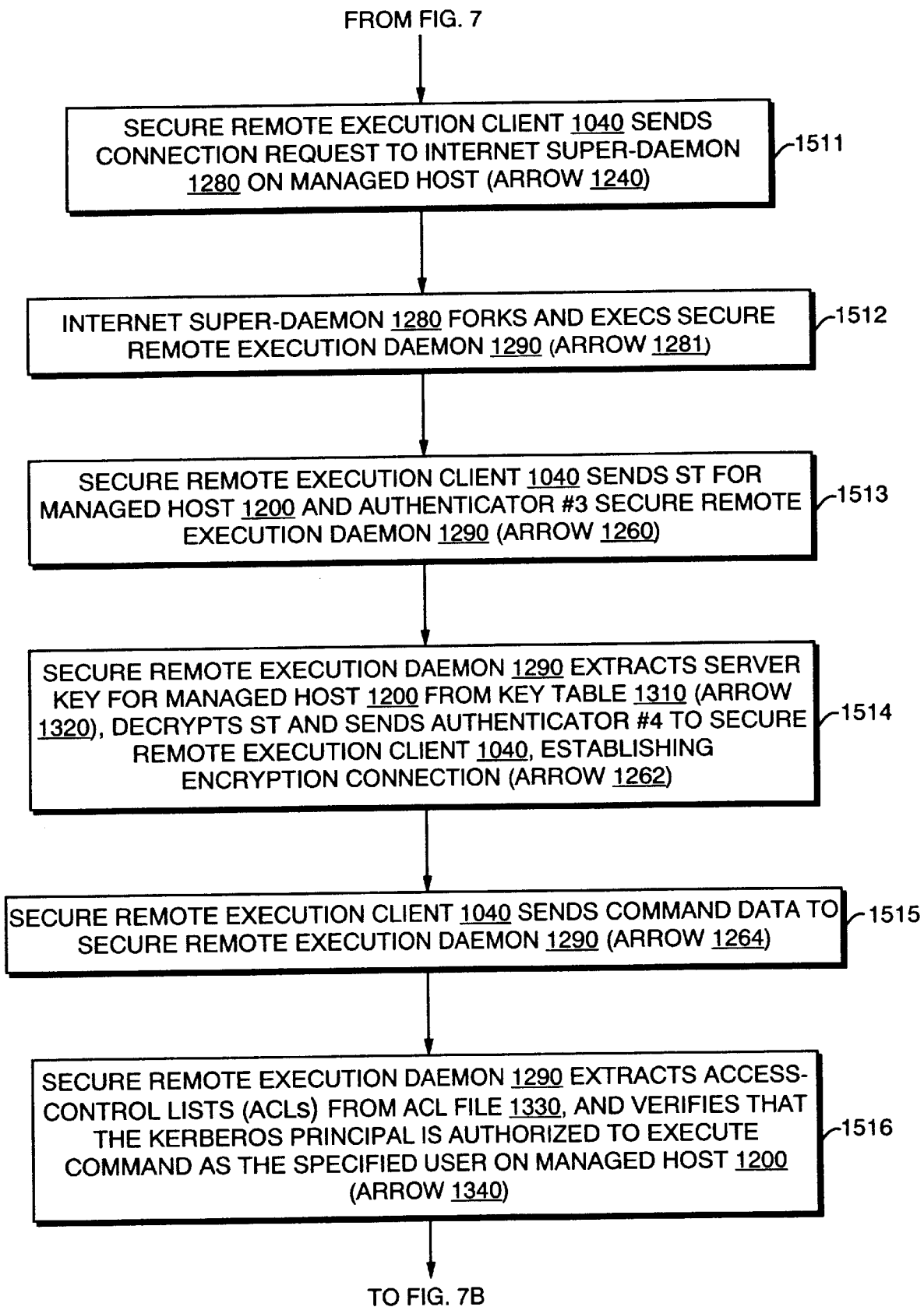
FIGS. 7–7b are flow charts showing the operation of the system of FIG. 6 in accordance with the present invention.
Figure 7B:
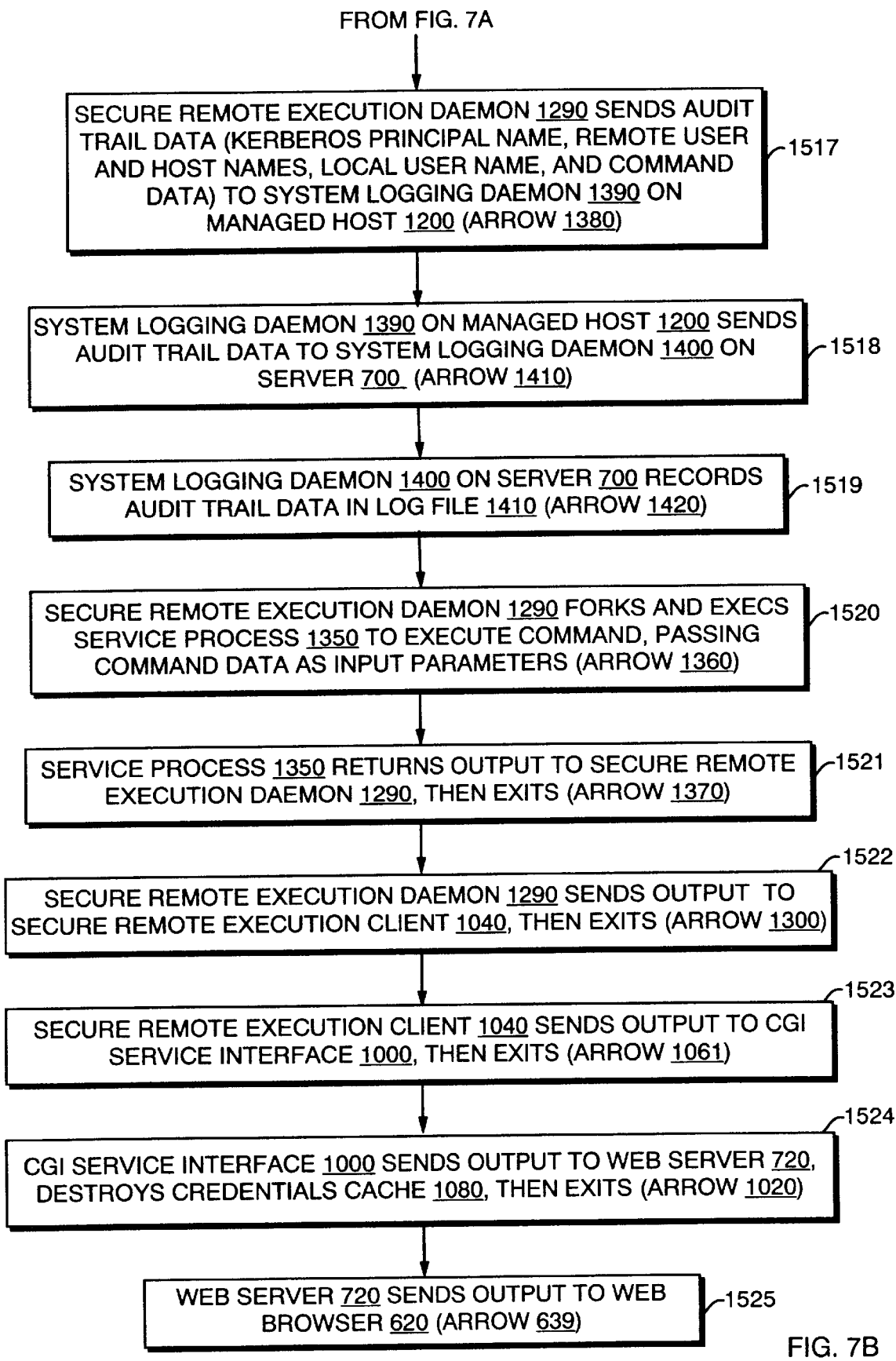

Once proper login has been accomplished as described in FIGS. 4 and 5–5*a*, a command can be issued from client 600 to the managed host 1200 as described in FIGS. 6 and 7–7*b*. Figure numbers in FIGS. 6 and 7–7*b* correspond to like structure and steps in FIGS. 4 and 5–5*a*.

With reference now to FIG. 6, web browser 620 of client 600 communicates with web server 720 of network server 700 as indicated by arrows 638 and 639. Web server 720 exchanges data with CGI Service Interface 1000 as indicated by arrows 1010 and 1020. CGI interface 1000 passes command data to the Secure Remote Execution Client 1040 as indicated at arrow 1060. The Secure Remote Execution Client 1040 is a process forked by CGI Service Interface 1000. CGI Service Interface 1000 also passes data to credentials cache 1080 as indicated at arrow 1090, and credentials cache 1080 in turn passes data including the TGT to the Secure Remote Execution Client 1040 as shown by arrow 1100. Secure Remote Execution Client 1040 communicates with the KDC 900 of Kerberos Server 840 as indicated by arrows 1110 and 1120.

The Secure Remote Execution Client 1040 can also send data to Managed Host 1200, indicated generally by dotted lines 1220, as shown by arrows 1240, 1260 and 1264. More specifically, the Secure Remote Execution Client 1040 sends data to Internet Super-Daemon 1280 as shown by arrow 1240, and also to the Secure Remote Execution Daemon 1290 as shown by arrows 1260 and 1264. Internet Super-Daemon 1280 is a persistent daemon process. Secure Remote Execution Daemon 1290 is a process forked by Internet Super-Daemon 1280. Secure Remote Execution Daemon 1290 also communicates with Secure Remote Execution Client 1040 as shown by arrows 1262 and 1300. Secure Remote Execution Daemon 1290 has access to key table 1310 as shown by arrow 1320 and also has access to ACL file 1330 as indicated by arrow 1340. Key table 1310 is preferably a file readable only by the root user on the managed host. The Secure Remote Execution Daemon 1290 further exchanges information with the Service Process 1350, which is a process forked by the Secure Remote Execution Daemon 1290, as indicated by arrows 1360 and 1370. Secure Remote Execution Daemon 1290, as indicated by arrow 1380, can send data to System Logging Daemon 1390, which is a persistent daemon process. System Logging Daemon 1390 further communicates with System Logging Daemon 1400 of Server 700 as indicated by arrow 1410. System Logging Daemon 1400, which is a persistent daemon process, has access to log file 1410 as indicated by arrow 1420, for purposes of making a non-volatile record of all secure remote execution activity.

With reference now to the flow charts of FIGS. 7–7*b*, the system of FIG. 6 operates in the following manner. The term "Arrow" used in the boxes of the flowchart refers back to the corresponding numbers in FIG. 6. Web browser 620 submits command data and encoded credentials cache to web server 720. [Box 1501]. Web server 720 executes CGI Service Interface 1000, and passes the encoded credentials cache in the environment and command data over standard input from web server 720 to CGI Interface 1000. [Box 1502].

CGI Service Interface 1000 decodes the encoded credentials cache and restores it to a credentials cache 1080. [Box 1503]. CGI Service Interface 1000 executes the Secure Remote Execution Client 1040, passing command data as input parameters from CGI Service Interface 1000 to Secure Remote Execution Client 1040. [Box 1504]. The Secure Remote Execution Client 1040 extracts the TGT and KDC session key from credentials cache 1080. [Box 1505].

Then, the Secure Remote Execution Client 1040 sends the TGT and an authenticator #1 to KDC 900. [Box 1506]. The KDC 900 decrypts the TGT and sends authenticator #2 to Secure Remote Execution Client 1040. [Box 1507]. Secure Remote Execution Client 1040 then sends a request for a server ticket (ST) for Managed Host 1200 to KDC 900. [Box 1508]. KDC 900 creates a server session key and extracts the Kerberos server principal key for Managed Host 1200 from Kerberos database 910. [Box 1509]. KDC 900 creates a Kerberos ST, for Managed Host 1200 and then sends the ST, along with the server session key encrypted with the KDC session key, back to Secure Remote Execution Client 1040, which decrypts the server session key with the KDC session key. [Box 1510]. Then, the Secure Remote Execution Client 1040 sends the connection request to Internet Super-Daemon 1280 of Managed Host 1200. [Box 1511].

Internet Super-Daemon 1280 forks and executes the Secure Remote Execution Daemon 1290, passing command line parameters specifying encryption requirements. [Box 1512]. The Secure Remote Execution Client 1040 sends the ST for Managed Host 1200 and authenticator #3 to Secure Remote Execution Daemon 1290. [Box 1513]. The Secure Remote Execution Daemon 1290 extracts the server key for Managed Host 1200 from key table 1310, decrypts the server ticket and sends authenticator #4 to Secure Remote Execution Client 1040, establishing an encrypted connection. [Box 1514]. Secure Remote Execution Client 1040 then sends command data to Secure Remote Execution Daemon 1290. [Box 1515]. The Secure Remote Execution Daemon 1290 also extracts access-control lists (ACLs) from ACL file 1330, and verifies that the Kerberos principal is authorized to execute the command as the specified user on Managed Host 1200. [Box 1516].

The Secure Remote Execution Daemon 1290 also sends audit trail data (such as, for example, the Kerberos principal name, remote user and host names, local user name, and command data) to System Logging Daemon 1390 on Managed Host 1200. [Box 1517]. This is to provide a record of all secure remote execution activity. In turn, the System Logging Daemon 1390 can send audit trail data to System Logging Daemon 1400 on Server 700. [Box 1518]. The System Logging Daemon 1400 records audit trail data in log file 1410. [Box 1519].

The Secure Remote Execution Daemon 1290 executes Service Process 1350 to execute the command and passes command data as input parameters. [Box 1520]. The Service Process 1350, which is a process forked by Secure Remote Execution Daemon 1290, returns output to Secure Remote Execution Daemon 1290, and then exits. [Box 1521]. The Secure Remote Execution Daemon 1290 sends output to Secure Remote Execution Client 1040, and then exits. [Box 1522]. The Secure Remote Execution Client 1040 sends output to CGI Service Interface 1000, and then exits. [Box 1523]. The CGI Service Interface 1000 sends output to Web Server 720, destroys credentials cache 1080 and, then exits. [Box 1524]. Web Server 720 then sends output to Web Browser 620. [Box 1525]. This allows the user at the client system to see the results of the command that was executed.

It should be understood that more than one server and client can be used, and that this invention is equally applicable to multiple clients and multiple destination servers.

As used herein, it is understood that the term "secure," as applied to network server 300, destination server 500, and KDC 400, means that information stored in the servers is accessible under normal, expected operating conditions only by suitably authorized individuals.

While there have been shown what are presently considered to be preferred embodiments of the invention, it will be apparent to those skilled in the art that various changes and modifications can be made herein without departing from the scope of the invention as defined by the appended claims.

What is claimed is:

1. A method of enhancing the security of a message sent through a network server from a client computer to a destination server, comprising the steps, performed by the network server, of:

(a) receiving at least one request for authentication from said client computer;

(b) establishing a secure connection for receiving data from said client computer;

(c) generating a credentials cache containing client-authenticating information from a validation center;

(d) transmitting said credentials cache to said client computer and erasing said client-authenticating information from the network server;

(e) receiving from said client computer a new credentials cache containing said client-authenticating information and a corresponding message for said destination server;

(f) obtaining permission data for accessing said destination server from said validating center using said client-authenticating information and a secure authentication protocol; and (g) transmitting said permission data and said message to said destination server.

2. The method of claim 1, further comprising the additional steps of the network server, in response to said request from said client, transmitting to said client a network server key associated with a public-private key pair and a known cryptographic algorithm, receiving back from said client a session key encrypted using said cryptographic algorithm and said network server key, and sending the client information encrypted using the known algorithm and said session key to authenticate the network server to said client.

3. The method of claim 1, wherein said network establishes a secure connection using the Secure Sockets Layer (SSL) protocol.

4. The method of claim 1, wherein the step of generating said credentials cache includes the steps of:

(a) sending a request for a permission indicator on behalf of said client computer to said validating center;

(b) receiving said permission indicator from said validating center; and (c) storing said permission indicator in said credentials cache.

5. The method of claim 4, wherein the step of receiving said permission indicator is performed using a DES symmetric secret-key based authentication protocol.

6. The method of claim 1, wherein the step of generating said credentials cache uses client-authenticating information obtained using a Kerberos protocol.

7. The method of claim 4, wherein the step of generating the credentials cache further includes the steps of:

(a) receiving a security session key encrypted using a known algorithm with a user key;

(b) generating the user key from said client-identifying information; and (c) decrypting said security session key at said network server using said known algorithm to obtain said security session key and said permission indicator.

8. The method of claim 7, wherein the step of generating the user key from said client-identifying information further is performed by a one-way hash algorithm applied to a client password.

9. The method of claim 7, wherein the step of transmitting said credentials cache to said client computer further includes the steps of:

encoding said credentials cache, wherein said credentials cache includes said security session key and said permission indicator.

10. The method of claim 9, wherein the step of encoding said credentials cache is performed by ASCII encoding.

11. The method of claim 10, wherein the step of encoding said credentials cache further includes the use of URL-encoding.

12. The method of claim 11, wherein the step of obtaining permission data for accessing said destination server, further includes the steps of the network server:

(a) transmitting said permission indicator to said validating center; and (b) receiving an access indicator, if permission indicator is authenticated by validating center to be the same permission indicator as previously received from said validating center.

13. The method of claim 1, further including the step of validating the authority of said client computer to access the destination server using said permission data.

14. The method of claim 13, wherein the step of the destination server validating the authority of said client to access the destination server further includes the steps of:
   (a) authenticating that the party transmitting the message to said destination server is the same party that was certified using the authentication protocol by the key distribution center to receive said access indicator; and
   (b) deciding on the basis of access control criteria whether said client is authorized to access the destination server.

15. A computer system comprising:
   (a) a first computer server issuing commands over a network connection;
   (b) a second computer server connected to said first server by a secure connection, said second server further having an authentication device generating an authentication request relating to said first server and generating a credentials cache containing client-authenticating information received in response to said authentication request, wherein said second server transmits said credentials cache to said first server and erases said client-authenticating information;
   (c) a third computer server responsive to said second server over said network and capable of receiving said authentication request, responding to said request to authenticate the identity of said first computer server, and sending authentication indicator information regarding said first server back to said second server; and
   (d) a fourth computer server for operative connection to said network and capable of receiving and executing said commands if said second server transmits authentication indicator information to said fourth server authenticating said first server.

16. A computer system having improved security for a message sent over an insecure network from a client computer to a destination server via a network server, said system comprising:
   (a) means for establishing a secure network connection between said client computer and said network server;
   (b) means for obtaining at the network server client-authenticating information from a validating center in a secure manner and generating a credentials cache therefrom;
   (c) means for transmitting said credentials cache containing said client-authenticating information from said network server to said client computer and erasing said client-authenticating information from said network server;
   (d) means for transmitting said message and said client identifying information from said client computer to said network server; and
   (e) means for obtaining permission to access said destination server from said validating center over said insecure network using the secure authentication protocol.

17. The computer system of claim 16, further comprising means for validating at the destination server the authority of said client to access said destination server using said message and
   means for accessing said destination server with said message if the authority of the client is validated.

18. The computer system of claim 16, wherein said means for establishing said secure network connection comprising SSL protocol.

19. The computer system of claim 16, wherein said means for obtaining client-authenticating information comprises a Kerberos protocol.

20. A network computer server comprising:
   (a) a client network interface for receiving client-identifying information from a client computer over a secure network connection;
   (b) a permission-granting network interface for exchanging client-authenticating information and permission-granting data with a validating center through a network connection and means for generating a credentials cache therefrom;
   (c) means for transmitting said credentials cache containing said client-authenticating information received from said validating center to said client without retaining said client-authenticating information; and
   (d) a destination computer network interface for operative communication with a destination computer through which client-authenticating information received back from said client computer and permission-granting data received from said validating center is transmitted to said destination computer via a network connection.

21. A network computer server of claim 20, wherein the client network interface further includes:
   (a) a web server for receiving a request for authentication from said client;
   (b) a network server key data base containing a key associated with a public-private key pair of a known cryptographic algorithm;
   (c) a decryptor for decrypting a client-generated session key generated by said client and encrypted using the public key of said key pair and said known cryptographic algorithm; and,
   (d) an encryptor capable of encrypting an authenticating message using said session key and said cryptographic algorithm.

22. A network computer server of claim 20, wherein the network connection through which the client-identifying information is received from said client is secured by using the Secure Sockets Layer (SSL) protocol.

23. A network computer server of claim 20, wherein said permission-granting interface is made secure by using a Kerberos authentication protocol.

24. A method of enhancing the security of a message sent through a network server from a client computer to a destination server, comprising the steps, performed by the network server, of:
   (a) obtaining client-authenticating information from a validation center using client-identifying information and a secure authentication protocol;
   (b) transmitting to said client computer a credentials cache containing said client-authenticating information;
   (c) erasing said client-authenticating information;
   (d) receiving said credentials cache and a message for said destination server back from said client computer;
   (e) obtaining permission data for accessing said destination server from said validating center using said credentials cache and a secure authentication protocol; and,
   (f) transmitting said permission data and said message to said destination server.

25. A computer server responsive to a client, validation center, and destination server over a network, the server comprising:

means for obtaining client-authenticating information on behalf of the client from the validation center using client-identifying information and a secure authentication protocol;

means for transmitting to said client a credentials cache containing said client-authenticating information;

means for erasing said client-authenticating information from said network server;

means for receiving said credentials cache and a message for said destination server back from said client; and means for obtaining permission data for accessing said destination server on behalf of said client from said validating center using said credentials cache and a secure authentication protocol.

26. A method of providing improved security of a network transaction, comprising the steps performed by a server of:

(a) establishing a secure connection for receiving data from a client;

(b) generating a credentials cache containing client-authenticating information from a source external to the server;

(c) transmitting the credentials cache to the client; and (d) erasing the client-authenticating information from the server.

27. The method of claim 26, further comprising the steps of:

(e) receiving from the client the credentials cache;

(f) using the client-authenticating information, obtaining permission data for accessing a destination server on behalf of the client; and, (g) transmitting the permission data and a message to the destination server.

* * * * *